United States Patent [19]

de Leeuw et al.

[11] Patent Number: 4,661,704
[45] Date of Patent: Apr. 28, 1987

[54] IMAGE RECORDING AND READOUT DEVICE BASED ON LIGHT-STIMULABLE PHOSPHORS

[75] Inventors: Dagobert M. de Leeuw, White Plains; Jacob Khurgin, Croton-on-Hudson, both of N.Y.

[73] Assignee: North American Philips Corporation, New York, N.Y.

[21] Appl. No.: 754,100

[22] Filed: Jul. 12, 1985

[51] Int. Cl.$^4$ ............................................. G03C 5/16
[52] U.S. Cl. ............................... 250/327.2; 250/484.1
[58] Field of Search ........................... 250/327.2, 484.1

[56] References Cited

U.S. PATENT DOCUMENTS

| | | | |
|---|---|---|---|
| 3,975,637 | 8/1976 | Ikedo et al. | 250/327 |
| 4,236,078 | 11/1980 | Kotera et al. | 250/363 |
| 4,258,264 | 3/1981 | Kotera et al. | 250/484 |
| 4,420,688 | 12/1983 | Le Bars | 250/352 |
| 4,485,302 | 11/1984 | Tanaka et al. | 250/327.2 |
| 4,491,736 | 1/1985 | Teraoka | 250/484.1 |
| 4,554,454 | 11/1985 | Taniguchi | 250/327.2 |

FOREIGN PATENT DOCUMENTS 0126564 11/1984 European Pat. Off. .
1473689 5/1977 United Kingdom .

OTHER PUBLICATIONS

"Fuji Intelligent Diagnostic X-ray System" *Fuji film Product News.*
Takano, M. et al, "Improvement of Diagnostic Quality of Radiographic Image by Maximum Utilization of X-ray Energy and Image Processing" *XVth International Congress of Radiology,* Brussels, 1981.

*Primary Examiner*—Carolyn E. Fields
*Attorney, Agent, or Firm*—Marc D. Schechter

[57] ABSTRACT

An image recording and readout device has a light-stimulable phosphor layer for storing a radiation image. The image is read out of the phosphor layer by scanning the layer with a laser beam. A filter is provided between the phosphor layer and the laser to increase the coupling of the laser light into the phosphor layer. The filter passes stimulating laser radiation within an angular acceptance range and reflects stimulating radiation outside the acceptance range.

29 Claims, 7 Drawing Figures

IMAGE RECORDING AND READOUT DEVICE BASED ON LIGHT-STIMULABLE PHOSPHORS

BACKGROUND OF THE INVENTION

The invention relates to a device which utilizes a light-stimulable phosphor layer for recording and storing radiation images for readout at a later time. The phosphor layer has an energy gap between its conduction and valence bands. One or more defect energy levels are present in the energy gap. Electron/hole pairs are generated in the phosphor layer by exposing the layer to radiation in the image to be recorded. Some of these electrons or holes are trapped in the defect energy levels as they attempt to recombine. These trapped electrons or holes can be stimulated to recombine by exposing the phosphor layer to light. When the electrons or holes recombine, luminescent radiation is emitted by the phosphor, and the recorded image is read out.

U.S. Pat. No. 4,236,078 describes a method and device for recording and reproducing a radiation image which uses light-stimulable phosphors. The device includes a radiation source and a radiation image storage panel. The source irradiates an object to form a radiation image of the object on the panel. The radiation image is stored in the panel in the form of electrons or holes trapped in defect energy levels.

The radiation image storage panel is a phosphor layer which may be on a single transparent support base or sandwiched between two transparent support bases.

The image stored in the panel is read out by a light source such as a laser. The laser beam stimulates the panel to fluoresce. The intensity of the fluorescent light is proportional to the amount of radiation absorbed by the panel from the radiation image.

The fluorescent light emitted from the panel is passed to a photosensor. The photosensor generates an electrical signal proportional to the intensity of the fluorescent light. The signal is converted to an image by a reproduction device and a display device.

During readout of the stored image, a large part of the laser beam which is scanning the phosphor layer is reflected from the phosphor layer. This reflected laser light can be a source of noise if it is incident on the detector. Therefore, U.S. Pat. No. 4,236,078 provides a filter between the panel and the photosensor in order to remove any stray laser light which might be reflected off of the panel toward the photosensor.

Moreover, since a large part of the laser beam is reflected from the phosphor layer, less power is absorbed by the layer to stimulate luminescence. Therefore, either more powerful lasers must be used, or the phosphor layer must be scanned for a longer time in order to cause sufficient stimulated luminescence.

SUMMARY OF THE INVENTION

It is an object of the invention to provide an image recording and readout device using light-stimulable phosphors in which a lower powered laser beam can be used to stimulate luminescence by the phosphor without decreasing the luminescent intensity.

It is another object of the invention to provide an image recording and readout device in which an increased portion of the scanning laser beam is absorbed in the light-stimulable phosphor.

It is a further object of the invention to provide an image recording and readout device in which the image stored in the light-stimulable phosphor can be read out in a shorter time.

An image recording and readout device according to the invention includes an image-storage layer capable of absorbing incident radiation in an incident radiation image. Means are provided for scanning the image-storage layer with stimulating radiation to cause the image-storage layer to emit luminescent radiation. The stimulating radiation is incident on the image-storage layer over an angular scanning range.

Filter means is arranged between the image-storage layer and the scanning means so that the stimulating radiation which is incident on the image-storage layer passes through the filter means. The filter means passes stimulating radiation incident on the filter means within an angular acceptance range. The filter means reflects stimulating radiation incident thereon within an angular reflectance range outside of the angular acceptance range. The angular scanning range is within the angular acceptance range.

The filter means may be arranged parallel to the image-storage layer. The filter means may be spaced from the image-storage layer by a distance of at most a few microns.

Typically, the filter means will be substantially planar. A desirable angular acceptance range will be from 0° to 25° with respect to the plane of the filter.

The wavelengths of the incident radiation, luminescent radiation, and stimulating radiation will, typically, be different from one another.

The image stored in the image-storage layer is read out by scanning the image-storage layer with stimulating radiation. The image-storage layer then emits luminescent radiation to form a luminescent radiation image corresponding to the incident image.

Preferably, the filter means passes luminescent radiation incident on the filter means over substantially all angles of incidence.

Alternatively, the filter means may reflect luminescent radiation incident on the filter means over substantially all angles of incidence.

The filter means according to the invention may be a multilayer interference filter having alternating layers of higher and lower indices of refraction.

An image recording and readout system according to the invention further includes an X-ray source for irradiating an object and forming an X-ray image of the object on the image-storage layer. Such a system may also include means for detecting the luminescent radiation emitted by the image-storage layer and for generating an electrical signal representing the luminescent radiation image.

The scanning means according to the invention may comprise a helium-neon laser emitting a radiation beam having a wavelength of approximately 633 nanometers. The scanning means may further include means for deflecting the radiation beam emitted from the laser.

DESCRIPTION OF THE PREFERRED EMBODIMENTS

Figure 1:
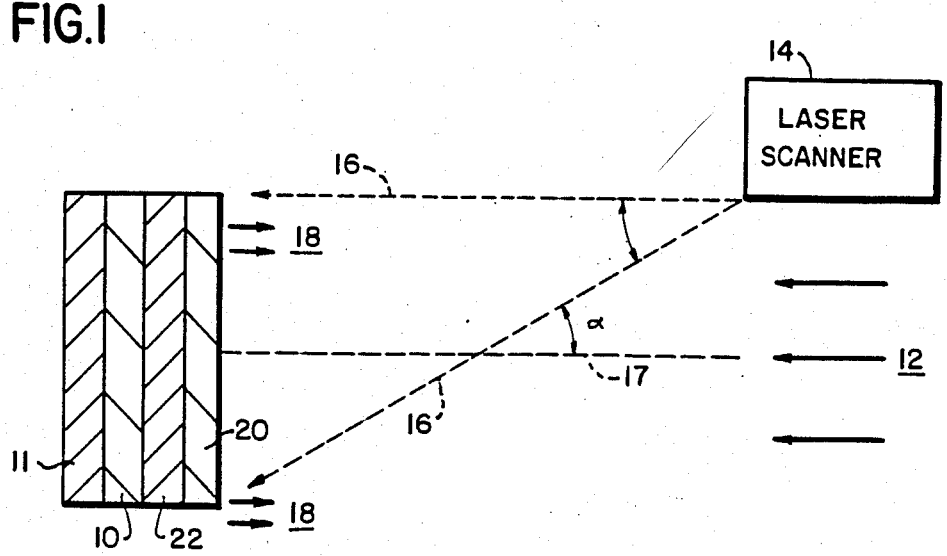
FIG. 1 is a partly cross-sectional, partly schematic view of a first embodiment of an image recording and readout device according to the invention.

The image recording and playback device shown in FIG. 1 (not to scale) includes an image-storage layer 10 on a substrate 11. Image-storage layer 10 is capable of absorbing incident radiation 12 which forms an incident radiation image on the image-storage layer 10.

The image-storage layer 10 is made of a light-stimulable phosphor material. Numerous light-stimulable phosphors are described in U.S. Pat. Nos. 4,236,078 and 4,258,264. Europium-activated barium-fluoride-bromide is particularly suitable due to its high efficiency of readout energy.

The substrate may be any solid material which can support the phosphor layer (that is, to which the phosphor layer will adhere). For example, the substrate may be a thin layer of polyethylene terephthalate.

The image recording and readout device further includes means 14 for scanning the image-storage layer 10 with stimulating radiation 16. The stimulating radiation is incident on the image-storage layer 10 over an angular scanning range. The angular scanning range is defined by the angles $\alpha$ between the stimulating radiation beam 16 and the normal 17 to the image storage layer at the two extreme scan positions shown in FIG. 1.

The scanning of the image-storage layer 10 with the stimulating radiation 16 causes the image-storage layer 10 to emit luminescent radiation 18. With the europium-activated BaFBr light-stimulable phosphor material discussed above, the stimulating radiation 16 may be around 633 nanometers (red), and the luminescent radiation 18 will be around 400 nanometers (blue).

Still referring to FIG. 1, the image recording and readout device according to the invention further includes filter means 20 arranged between the image-storage layer 10 and the scanning means 14 so that the stimulating radiation 16 which is incident on the image-storage layer 10 will have passed through the filter means 20. The filter means 20 is designed to pass stimulating radiation 16 which is incident on the filter means at an angle $\alpha$, whenever the angle $\alpha$ is within an angular acceptance range. The filter means 20 reflects stimulating radiation 16 which is incident on the filter means at an angle $\alpha$ within an angular reflectance range outside of the angular acceptance range.

As shown in FIG. 1, the filter means 20 is arranged parallel to the image-storage layer 10. The filter means 20 is also spaced from the image-storage layer 10 by a transparent spacer layer 22. The spacer layer 22 is preferably no more than a few microns thick. In the embodiment of the invention shown in FIG. 1, the spacer layer 22 must be transparent to the incident radiation 12, the stimulating radiation 16, and the luminescent radiation 18. The spacer layer 22 may be, for example, polyethylene terephthalate.

The filter means 20 is preferably substantially planar. It has been found suitable to design the filter means 20 to pass stimulating radiation incident thereon at an angle within the range of 0° to 25° with respect to the normal to the plane of the filter means 20. In other words, the angular acceptance range will be 0° to 25°, and so stimulating radiation 16 incident on the filter means 20 at an angle $\alpha$ between 0° and 25° will pass through the filter means 20 to the image-storage layer 10.

It should be understood that in practice the filter means 20 will most likely not pass the entire stimulating radiation beam 16 even when the angle $\alpha$ is within the angular acceptance range. Therefore, for the purposes of the present invention, the angular acceptance range includes those angles of incidence over which the filter means 20 will transmit at least 50% of the stimulating radiation 16 incident thereon. Angles of incidence over which the filter means 20 reflects more than 50% of the incident radiation can be considered to be within the angular reflectance range. Due to absorption by the filter (which is preferably minimized), there will be some intermediate angles of incidence over which less than 50% of the stimulating radiation is transmitted and less than 50% of the stimulating radiation is reflected. These intermediate angles of incidence are neither in the angular acceptance range nor in the angular reflectance range.

Preferably, the filter will transmit at least 90% of the stimulating radiation incident thereon throughout the angular acceptance range, and will reflect at least 90% of the stimulating radiation incident thereon through the angular reflectance range. It is also preferable to bring the angular acceptance range as close as possible to the angular reflectance range in order to minimize the intermediate angles over which both transmission and reflection are less than 50%.

Figure 2:
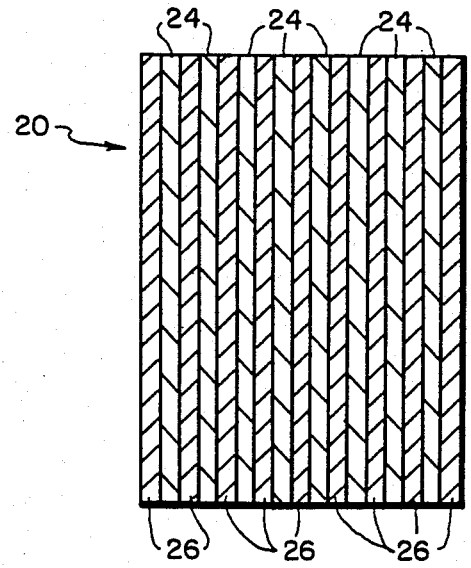
FIG. 2 is a detailed cross-sectional view of the filter 20 of FIG. 1.

The filter means 20 is preferably a multilayer interference filter. Referring to FIG. 2 (not to scale), the filter means 20 is made of, for example, seventeen alternating layers of higher and lower indices of refraction. The high refractive index layers 24 may be $TiO_2$, $Ta_2O_5$, or ZnS. The low refractive index layers 26 may be $SiO_2$, or $MgF_2$. An example of a filter construction appears in Table 1 below. In this filter, each layer 24 is $TiO_2$, and each layer 26 is $SiO_2$.

TABLE 1

| Layer Number | Refractive Index (as deposited) | Thickness in nanometers (as deposited) |
| --- | --- | --- |
| 1 | 1.45 | 80 |
| 2 | 2.35 | 101 |
| 3 | 1.45 | 147 |
| 4 | 2.35 | 80 |
| 5 | 1.45 | 133 |
| 6 | 2.35 | 80 |
| 7 | 1.45 | 133 |
| 8 | 2.35 | 80 |
| 9 | 1.45 | 133 |
| 10 | 2.35 | 80 |
| 11 | 1.45 | 133 |
| 12 | 2.35 | 80 |
| 13 | 1.45 | 133 |
| 14 | 2.35 | 80 |
| 15 | 1.45 | 133 |
| 16 | 2.35 | 80 |
| 17 | 1.45 | 65 |

Figure 3:
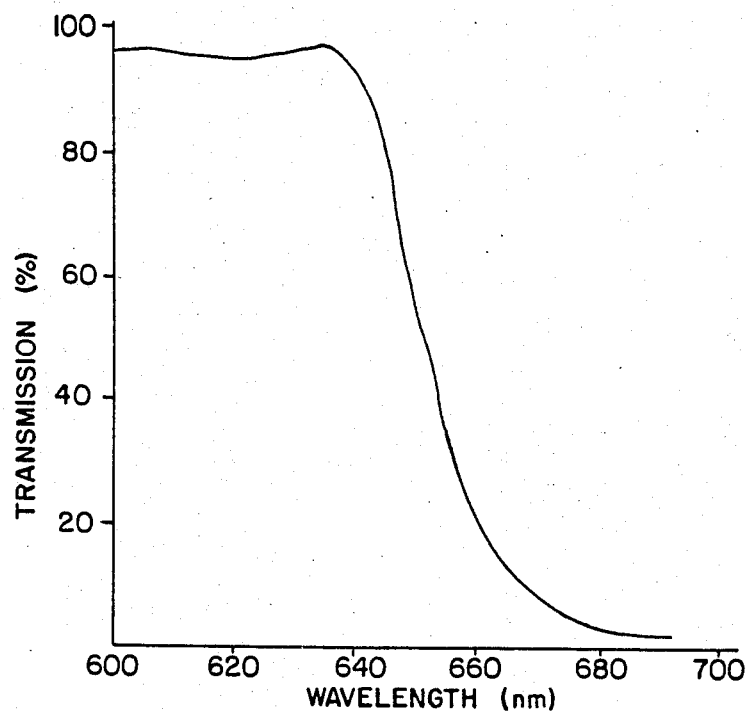
FIG. 3 is a graph of the transmission of light through the filter 20 of FIG. 2 versus the wavelength of the incident light.

FIG. 3 is a graph of the transmission versus wavelength for the filter 20 shown in FIG. 2 and having the construction described in Table 1. At 633 nanometers, the transmission through this filter (at an angle of incidence of 0 degrees) is approximately 97%.

Figure 4:
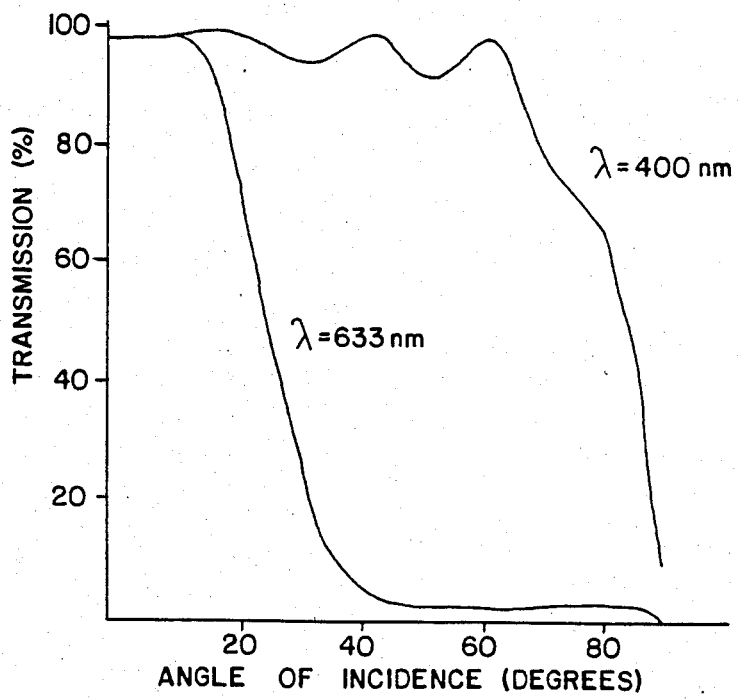
FIG. 4 is a graph of the transmission of light through the filter 20 of FIG. 2 versus the angle of incidence of the light on the filter for wavelengths of 400 and 633 nanometers.

FIG. 4 is a graph of the transmission versus angle of incidence ($\alpha$) for 400 and 633 nanometer beams incident on the filter 20 having the construction described in Table 1. In such a filter, 633 nanometer laser light (stimulating radiation) incident on the filter at an angle $\alpha$ between 0° and 25° will have a transmission coefficient through the filter at or above approximately 50%. For angles $\alpha$ greater than 25°, the transmission coefficient decreases to approximately 5%. Since the filter has low absorption, most 633 nanometer light incident at angles greater than 25° will be reflected. In contrast, 400 nanometer light is nearly fully transmitted over angles of incidence from 0° to approximately 70°.

The provision of the filter means 20 increases the portion of the stimulating radiation 16 which is absorbed in the light-stimulable phosphor of the image-storage layer 10 in the following manner. Most of the stimulating radiation 16 which is incident on the filter means 20 at an angle $\alpha$ which is within the angular acceptance range passes through the filter means 20 and through the spacer layer 22, onto the image-storage layer 10. The image-storage layer 10 absorbs a small portion of the stimulating radiation 16 and scatters the remainder of the stimulating radiation 16.

The scattered stimulating radiation 16 is scattered by the image-storage layer 10 over a wide angular range. Hence, only a small portion of the scattered stimulating radiation 16 will be incident on the filter means 20 within the angular acceptance range. The remainder of the scattered stimulating radiation 16 will be re-reflected by the filter means 20 back to the image-storage layer 10 where the process of absorption and scattering will be repeated. This process will be repeated until a large portion of the stimulating radiation 16 is absorbed by the image-storage layer 10.

Figure 5:
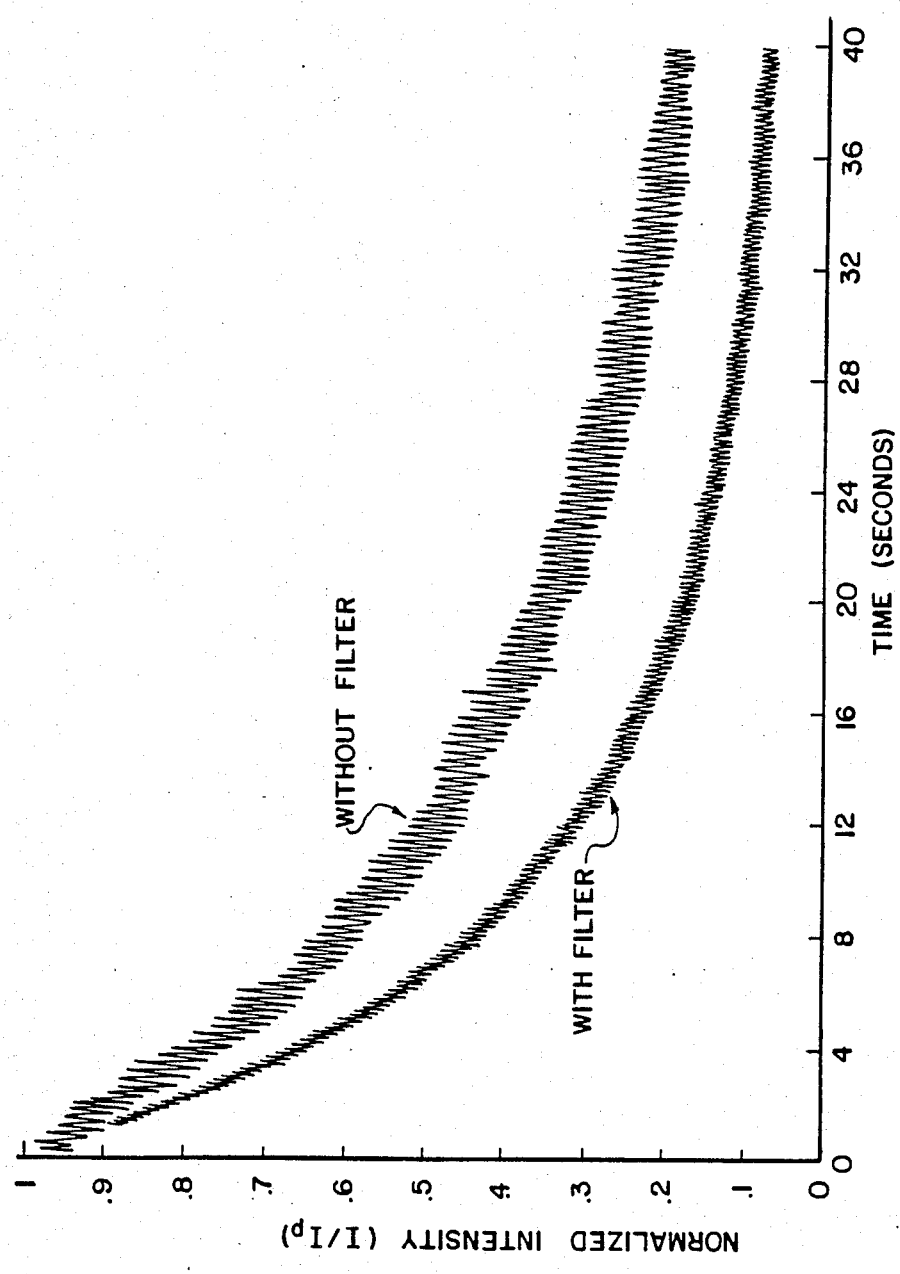
FIG. 5 is a graph of the normalized intensity of luminescent radiation emitted by the image-storage layer versus time, both with and without the use of a filter 20 during readout.

As a result of using the filter means 20 described above, a lower powered laser can be used to stimulate luminescence by the phosphor without decreasing the luminescent intensity. Alternatively, the power of the laser can be kept constant, and the readout speed can be increased. This latter alternative is shown in FIG. 5, which is a graph of the normalized intensity of the luminescent radiation (i.e. the intensity of the luminescent radiation, I, divided by the peak intensity of the luminescent radiation, $I_p$) versus time. For both curves, with and without a filter 20, the image-storage layer 10 was first exposed to equal amounts of incident radiation (X-radiation) for equal durations of time, and the image storage layer 10 was then exposed to equal amounts of stimulating radiation for equal durations of time.

Since both curves in FIG. 5 are approximately exponential, one-half of the luminescent intensity from the image-storage layer 10 is read out when the normalized intensity falls to approximately 0.5. As shown in FIG. 5, it takes almost twice as long without a filter 20 to read out half of the luminescent intensity (approximately 12 seconds) as it takes with a filter 20 (approximately 6.5 seconds).

It should be recognized that due to the scattering of the stimulating radiation 16 by the image-storage layer 10 and the reflection of the scattered radiation by the filter means 20, there will be some loss of resolution in the image formed by the luminescent radiation 18. However, this loss of resolution is minimized by arranging the filter means 20 as close as possible to the image-storage layer 10. This is accomplished by making the spacer layer 22 as thin as possible.

When a portion of the image-storage layer 10 is scanned with the stimulating radiation 16, luminescent radiation 18 will be emitted from that portion of the image-storage layer 10. The emitted luminescent radiation 18 must then pass through the filter means 20 in order to be detected. Accordingly, it is preferable that the filter means 20 pass luminescent radiation 18 which is incident on the filter means 20 over substantially all angles of incidence. The filter means 20 described above passes over 90% of the luminescent radiation (400 nanometers) incident thereon at angles up to 65°. (FIG. 4.)

While a specific filter 20 has been described above, other filters may alternatively be used according to the invention. For example, it may be necessary to design another filter for use with different radiation wavelengths and/or different angular acceptance ranges.

The filter 20 according to the invention may be manufactured using any one of a number of well known methods. For example, the filter may be manufactured by electron beam evaporation. If necessary, the filter can be annealed after manufacture to shift its spectral response.

Figure 6:
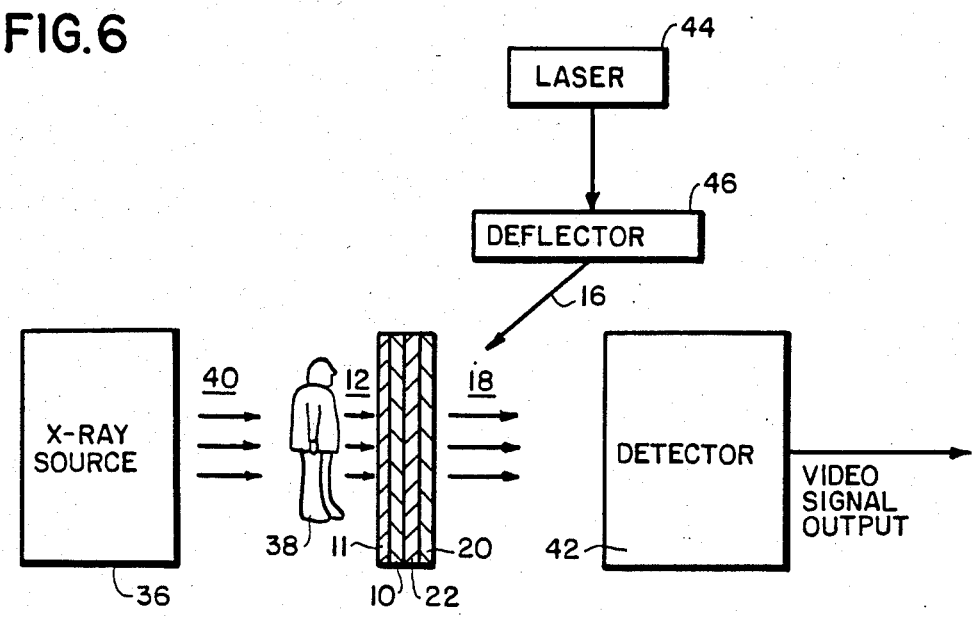
FIG. 6 schematically shows an image recording and readout system according to the invention.

An image recording and playback system according to the invention is shown in FIG. 6. The system includes an X-ray source 36 for irradiating an object 38 with X-rays 40 to form an X-ray image of the object 38 on the image-storage layer 10. Any conventional X-ray source may be used.

For ease of illustration, the X-ray source is shown in FIG. 6 irradiating the image-storage layer 10 from the side of substrate 11. In practice, however, the layer 10 will be irradiated from the opposite side. After it is irradiated, the layer 10 is then moved to a readout device.

The luminescent radiation 18 emitted by the image-storage layer 10 (due to scanning with stimulating radiation) is detected in a detector 42. The detector 42 generates an electrical signal representing the luminescent radiation image. The detector 42 may be a photomultiplier, a photodiode, or any other well known light-detecting device.

The means 14 for scanning stimulating radiation 16 across the image-storage layer 10 may be a laser 44 and a deflector 46. The deflector 46 deflects the beam 16 from the laser 44 onto the image-storage layer 10. Lasers and laser beam deflectors are well known devices. (See, for example, U.S. Pat. No. 4,258,264.)

The laser may be, for example, a helium-neon laser emitting a radiation beam having a wavelength of approximately 633 nanometers.

While not shown in FIG. 6, optical elements for focusing the luminescent radiation 18 onto the detector 42 may be provided between the detector 42 and the filter 20. A filter for removing stray stimulating (laser) radiation 16 may also be provided in front of the detector.

Figure 7:
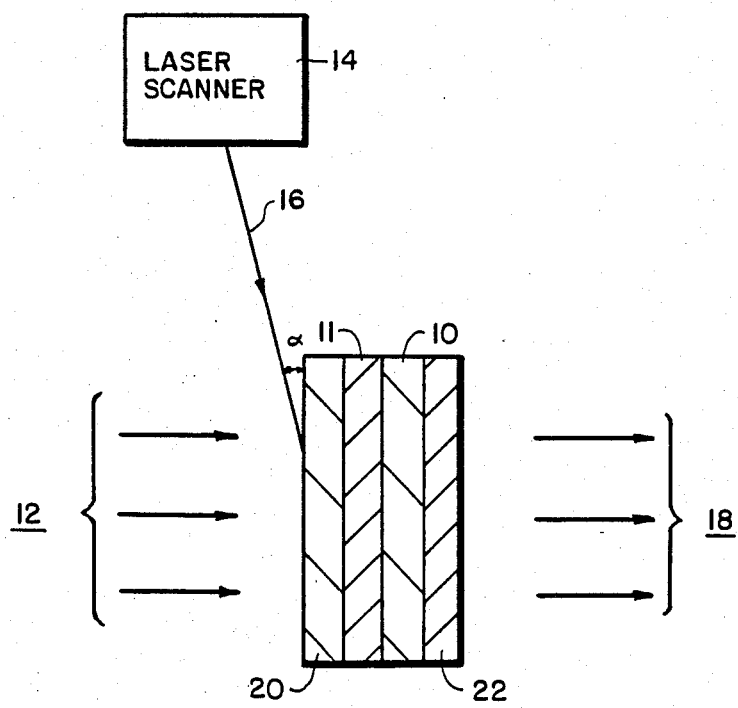
FIG. 7 is a partly cross-sectional, partly schematic view of another embodiment of an image recording and readout device according to the invention.

FIG. 7 (not to scale) shows another embodiment of an image recording and readout device according to the invention. As in the FIG. 1 embodiment, the device includes an image-storage layer 10, a substrate 11, and a filter means 20. However, in the embodiment of FIG. 7, the filter means 20 is on the opposite side of the image-storage layer 10, toward the X-ray source and opposite the detector. Also, the image-storage layer 10 is scanned by the stimulating radiation 16 from the side opposite the detector.

As described above, stimulating radiation 16 which is scattered by the image-storage layer 10 is reflected by the filter means 20 back toward the image-storage layer 10 in order to increase the portion of the stimulating radiation 16 which is absorbed in the light-stimulable phosphor of the image-storage layer 10. As a result, a lower power source of stimulating radiation 16 can be used.

In the embodiment of the image recording and playback device shown in FIG. 7, the filter means 20 reflects the luminescent radiation 18 which is incident on the filter means 20 over substantially all angles of incidence. In this way, the luminescent radiation 18 can be directed toward a radiation detector (not shown in FIG. 7).

The transparent spacer layer 22 in the FIG. 7 embodiment functions to protect the image-storage layer 10 from damage.

We claim:

1. An image recording and readout device comprising:
    an image-storage layer capable of absorbing incident radiation in an incident radiation image;
    means for scanning the image-storage layer with stimulating radiation to cause the image-storage layer to emit luminescent radiation, said stimulating radiation being incident on the image-storage layer over an angular scanning range; and
    filter means arranged between the image-storage layer and the scanning means so that the stimulating radiation which is incident on the image-storage layer passes through the filter means, said filter means passing stimulating radiation incident on the filter means within an angular acceptance range, said filter means reflecting stimulating radiation incident thereon within an angular reflectance range outside of the angular acceptance range, said angular scanning range being within the angular acceptance range.

2. A device as claimed in claim 1, characterized in that the filter means is arranged parallel to the image-storage layer.

3. A device as claimed in claim 2, characterized in that the filter means is spaced from the image-storage layer by a distance of at most a few microns.

4. A device as claimed in claim 3, characterized in that:
    the filter means is substantially planar and has a normal thereto; and
    the filter means passes stimulating radiation incident thereon at an angle within the range of 0° to 25° with respect to the normal to the plane of the filter means.

5. A device as claimed in claim 4, characterized in that:
    the incident radiation is substantially a first wavelength;
    the luminescent radiation is substantially a second wavelength;
    the stimulating radiation is substantially a third wavelength; and
    the first, second, and third wavelengths are all substantially different from each other.

6. A device as claimed in claim 5, characterized in that the image-storage layer emits luminescent radiation to form a luminescent radiation image corresponding to the incident image when the image-storage layer is scanned with stimulating radiation.

7. A device as claimed in claim 6, characterized in that the filter means passes luminescent radiation incident on the filter means over substantially all angles of incidence.

8. A device as claimed in claim 7, characterized in that the filter is a multilayer interference filter having alternating layers of higher and lower indices of refraction.

9. A device as claimed in claim 8, further comprising an X-ray source for irradiating an object and forming an X-ray image of the object on the image-storage layer.

10. A device as claimed in claim 9, further comprising means for detecting the luminescent radiation emitted by the image-storage layer and for generating an electrical signal representing the luminescent radiation.

11. A device as claimed in claim 10, characterized in that the scanning means comprises a helium-neon laser emitting a radiation beam having a wavelength of 633 nanometers.

12. A device as claimed in claim 11, characterized in that the scanning means further comprises means for deflecting the radiation beam emitted by the laser.

13. A device as claimed in claim 6, characterized in that the filter means reflects luminescent radiation incident on the filter means over substantially all angles of incidence.

14. A device as claimed in claim 1, characterized in that the image-storage layer emits luminescent radiation to form a luminescent radiation image corresponding to the incident image when the image-storage layer is scanned with stimulating radiation.

15. A device as claimed in claim 14, characterized in that the filter means passes luminescent radiation incident on the filter means over substantially all angles of incidence.

16. A device as claimed in claim 15, further comprising an X-ray source for irradiating an object and forming an X-ray image of the object on the image-storage layer.

17. A device as claimed in claim 16, further comprising means for detecting the luminescent radiation emitted by the image-storage layer and for generating an electrical signal representing the luminescent radiation.

18. A device as claimed in claim 1, characterized in that the filter means passes luminescent radiation incident on the filter means over substantially all angles of incidence.

19. A device as claimed in claim 18, further comprising an X-ray source for irradiating an object and forming an X-ray image of the object on the image-storage layer.

20. A device as claimed in claim 19, further comprising means for detecting the luminescent radiation emitted by the image-storage layer and for generating an electrical signal representing the luminescent radiation.

21. An image recording and readout medium comprising:
    an image-storage layer capable of absorbing incident radiation in an incident radiation image, said image-storage layer emitting luminescent radiation when scanned with stimulating radiation; and
    filter means arranged adjacent the image-storage layer, said filter means passing stimulating radiation incident on the filter means within an angular acceptance range, said filter means reflecting stimulating radiation incident thereon within an angular reflectance range outside of the angular acceptance range.

22. An image recording and readout medium as claimed in claim 21, characterized in that the filter means is arranged parallel to the image-storage layer.

23. An image recording and readout medium as claimed in claim 22, characterized in that the filter means is spaced from the image-storage layer by a distance of at most a few microns.

24. An image recording and readout medium as claimed in claim 23, characterized in that:
the filter means is substantially planar and has a normal thereto; and
the filter means passes stimulating radiation incident thereon at an angle within the range of 0° to 25° with respect to the normal to the plane of the filter means.

25. An image recording and readout medium as claimed in claim 24, characterized in that:
the incident radiation is substantially a first wavelength;
the luminescent radiation is substantially a second wavelength;
the stimulating radiation is substantially a third wavelength; and
the first, second, and third wavelengths are substantially different from each other.

26. A device as claimed in claim 25, characterized in that the image-storage layer emits luminescent radiation to form a luminescent radiation image corresponding to the incident image when the image-storage layer is scanned with stimulating radiation.

27. An image recording and readout device as claimed in claim 26, characterized in that the filter means passes liminescent radiation incident on the filter means over substantially all angles of incidence.

28. An image recording and readout medium as claimed in claim 27, characterized in that the filter is a multilayer interference filter having alternating layers of higher and lower indices of refraction.

29. An image recording and readout device as claimed in claim 26, characterized in that the filter means reflects luminescent radiation incident on the filter means over substantially all angles of incidence.

* * * * *